R. B. BENJAMIN.
LIGHTING DEVICE FOR MOTOR VEHICLES.
APPLICATION FILED NOV. 27, 1916.

1,381,391.

Patented June 14, 1921.

Witnesses:

Inventor:
Reuben B. Benjamin
By Jones, Addington, Ames & Seibold,
Attys.

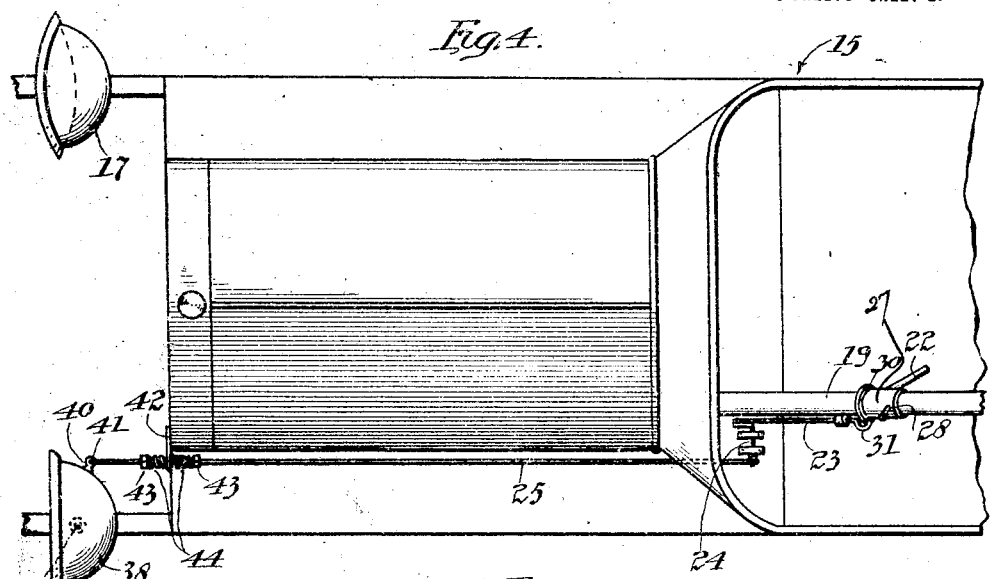
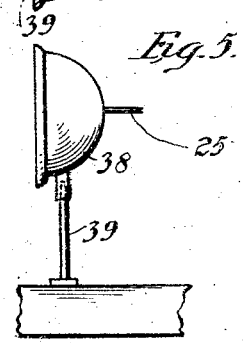
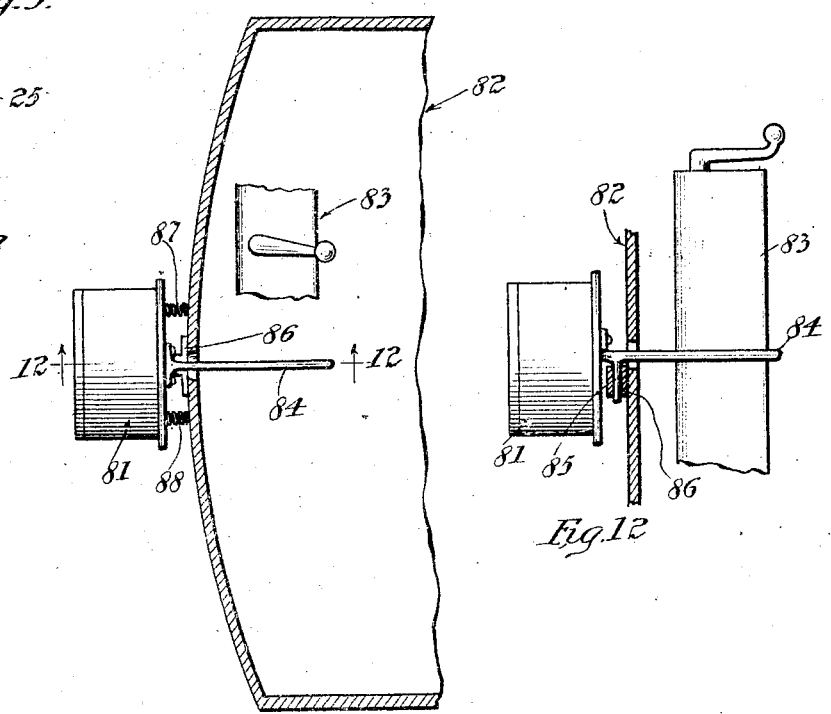

R. B. BENJAMIN.
LIGHTING DEVICE FOR MOTOR VEHICLES.
APPLICATION FILED NOV. 27, 1916.
1,381,391.
Patented June 14, 1921.
5 SHEETS—SHEET 3.
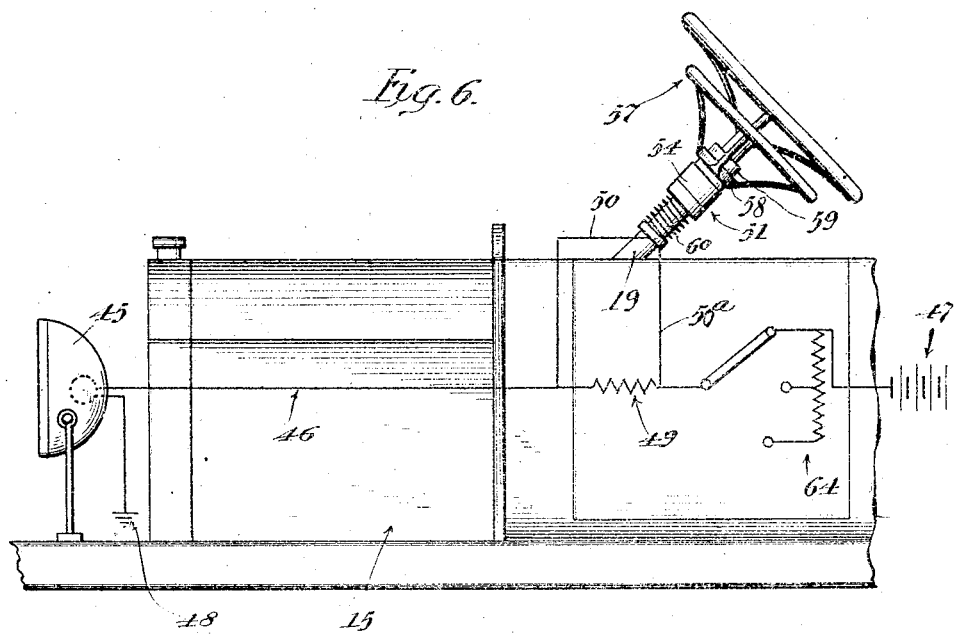
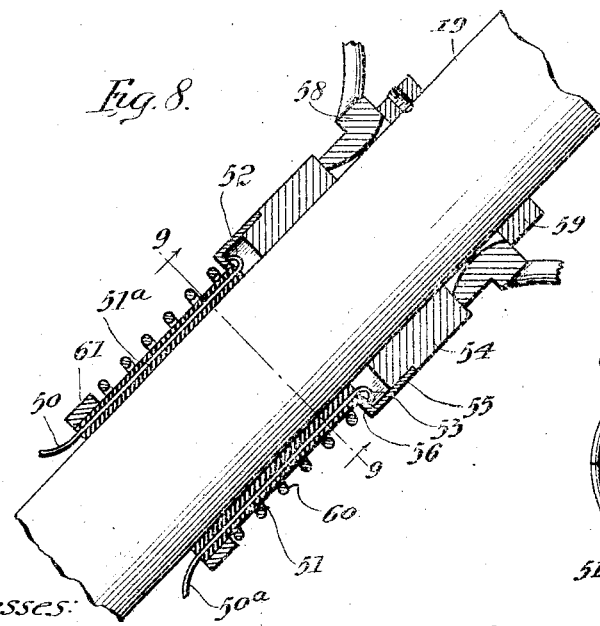
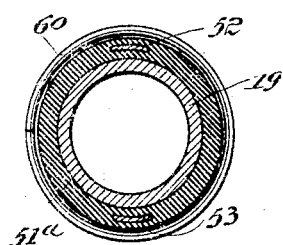
Inventor:
Reuben B. Benjamin
By Jones, Addington, Ames & Seibold
Attys.

R. B. BENJAMIN.
LIGHTING DEVICE FOR MOTOR VEHICLES.
APPLICATION FILED NOV. 27, 1916.
1,381,391.
Patented June 14, 1921.
5 SHEETS—SHEET 4.
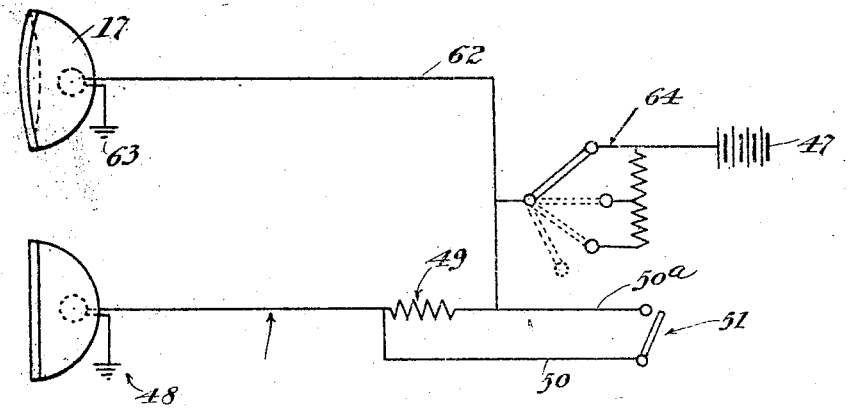
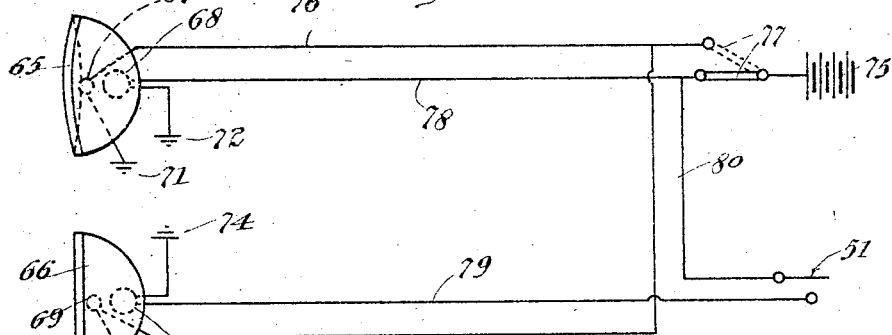
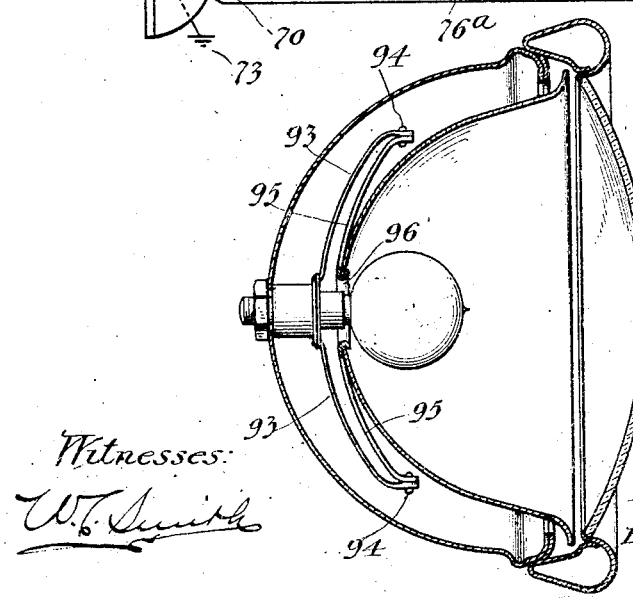
Inventor:
Reuben B. Benjamin

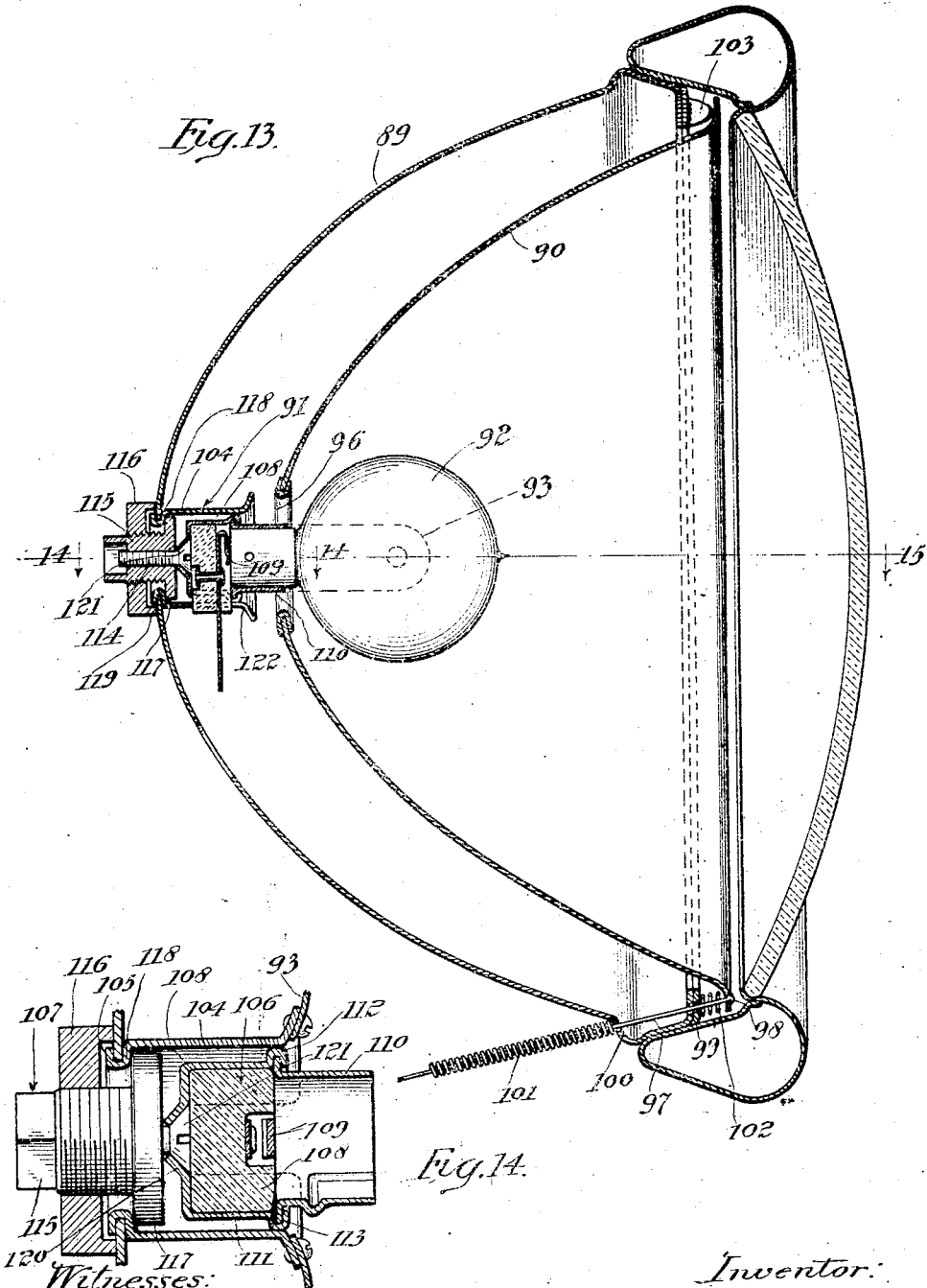

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

LIGHTING DEVICE FOR MOTOR-VEHICLES.

1,381,391.     Specification of Letters Patent.     Patented June 14, 1921.

Application filed November 27, 1916. Serial No. 133,610.

*To all whom it may concern:*

Be it known that I, REUBEN B. BENJAMIN, a citizen of the United States, residing at Chicago, in the county of Cook and State of Illinois, have invented new and useful Improvements in Lighting Devices for Motor-Vehicles, of which the following is a full, clear, concise, and exact description, reference being had to the accompanying drawing, forming a part of this specification.

My invention relates to lighting devices for motor vehicles.

Among the objects of my invention is to provide improved means for varying the distribution of light in a motor vehicle. In driving an automobile over country roads at night it has been found desirable to have a head-light or head-lights which will throw a strong beam of light a considerable distance ahead of the car. When a car thus equipped approaches another car this strong beam of light will blind the driver of the other car so it has become customary to dim these strong lights when approaching another car. This dimming of the lights, however, has this objection—that it leaves the roadway insufficiently lighted.

My invention contemplates the overcoming of this objection. It also contemplates a lighting system in which the driver of the motor vehicle can cause the beam of light to follow the roadway as it curves.

In the drawings, in which several embodiments of my invention are shown—

Fig. 4 is a plan view of the front part of an automobile provided with another form of lighting device;

Fig. 5 is a side elevation of one of the head-lights of Fig. 4;

Fig. 6 is a side elevation of the front part of an automobile provided with another form of lighting device, parts being indicated diagrammatically;

Fig. 7 is a diagrammatic view showing the circuits for the head-lights of Fig. 6;

Fig. 8 is a detail sectional view of a circuit breaker mounted on the steering post;

Fig. 9 is a section on the line 9—9 of Fig. 8;

Fig. 10 is a diagrammatic view showing the wiring of another form of lighting device;

Fig. 11 is a horizontal sectional view of the front part of an electric railway car provided with an automobile head-light;

Fig. 12 is a vertical section substantially on the line 12—12 of Fig. 11.

Fig. 13 is a vertical axial section of the head-light showing another form of my invention.

Fig. 14 is a horizontal section on the line 14—14 of Fig. 13 showing the lamp supporting device.

Fig. 15 is a section substantially on the line 15—15 of Fig. 13 showing the means for tiltably mounting the reflector.

Figure 1:
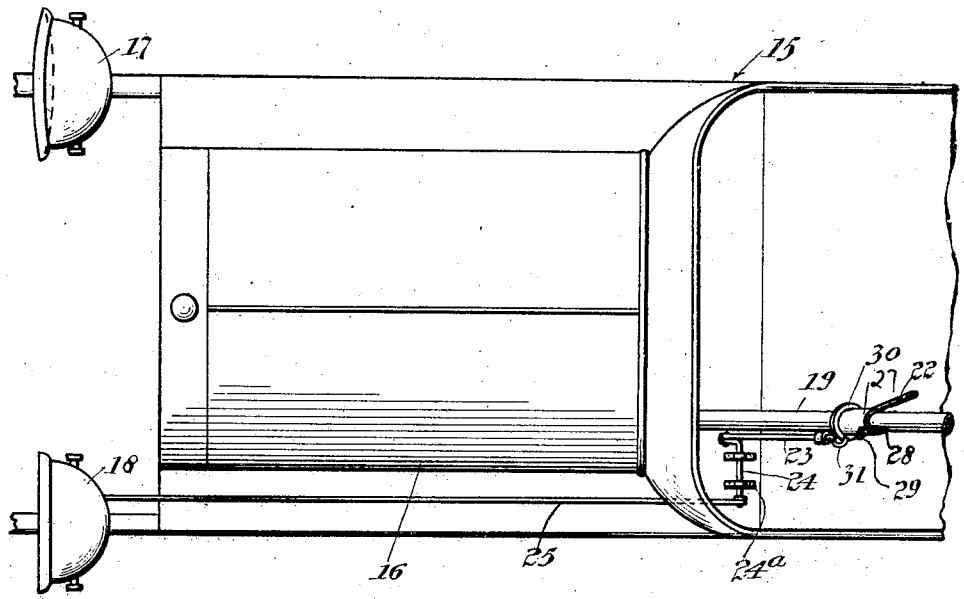
Figure 1 is a plan view of the front part of an automobile provided with my improved lighting device.
Figure 2:
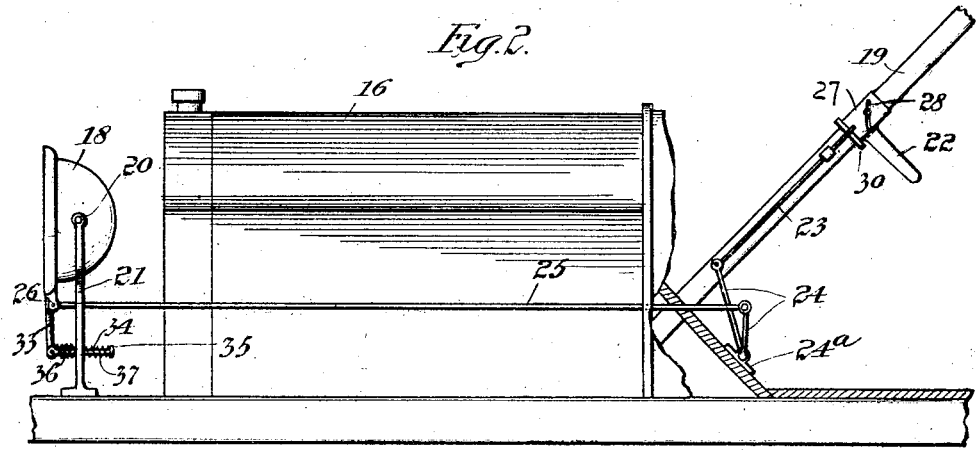
Fig. 2 is a side elevation of Fig. 1.
Figure 3:
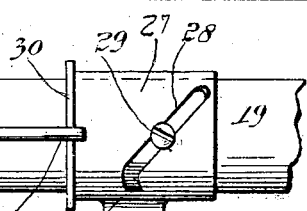
Fig. 3 is a detail view of part of the steering post and the operating lever.

Referring to the drawings in detail, and first to Figs. 1, 2, and 3, my invention is here shown in connection with an automobile 15 having a hood 16, head-lights 17 and 18, and a steering post 19. The head-light 17 is permanently mounted to direct the light downwardly and forwardly to illuminate the roadway directly in front of the automobile, but not to throw the light any considerable distance ahead. The head-light 18 is tiltable about a horizontal axis and is yieldingly held in normal position to direct the light a considerable distance ahead of the car but it can be readily tilted by the driver to throw the light down to illuminate the road-way directly in front of the car when approaching another car. For this purpose the head-light 18 is pivotally mounted at 20 on a bracket 21 and is tiltable by means of a knee lever 22 swingingly mounted on the steering post, through the link 23, bell crank lever 24 (mounted in bearings 24ª) to which the link 23 is pivotally secured, and a link 25 pivotally secured to the bell crank lever 24 and pivotally connected at 26 to the head-light 18. For mounting the lever 22 on the steering post the lever is provided with a sleeve 27 having a helical slot 28 through which extends a pin 29 secured to the steering post. The lower edge of the sleeve 27 has a flange 30 which engages a loop or hook 31 on the link 23. The slot 28 has an off-set portion 32 for holding the lever in extreme position when desired. For yieldingly holding the head-light 18 in its normal position the head-light is provided with a downwardly extending arm 33 to which is pivotally connected a link 34, extending through an opening in the bracket 21 and on the end of which is threaded a nut 35. Coil springs 36 and 37 surrounding the link 34 and engaging the bracket 21 normally hold the head-light in the position shown in Fig. 2.

In use the springs 36 and 37 normally hold the light 18 in the position shown in Fig. 2 but when approaching another car the knee lever 22 is operated to tilt the light 18 downwardly. As the head-light 17 is already directed downwardly the driver of the other car will not be blinded by the head-lights.

In Figs. 4 and 5 the automobile 15, head-light 17, steering post 19, knee lever 22, link 23, bell crank 24 and link 25 may be substantially the same as in the form of Figs. 1, 2 and 3. In the lighting device of this form, however, the head-light 38 is rotatably mounted on a standard 39 to swing about a vertical axis and is provided with an arm 40 pivoted at 41 to the link 25 where it can be operated from the knee lever 22. For normally holding the light 38 in straight ahead position a link 42 may be secured to the hood and a pair of nuts 43 may be secured on the link 25 and a pair of springs 44 may be located between the nuts 43 and the arm 42. In this form of lighting device the head-light 38 may be made to throw a beam of light to follow a winding road by shifting the knee lever 32 in one direction or the other.

In Figs. 6, 7, 8 and 9 a form of lighting device is shown in which instead of mechanically tilting one of the head-lights, one of the head-lights can be dimmed when desired. In this form of my invention the automobile 15, head-light 17, and steering post 19 may be the same as in the forms just described. In this form, however, instead of tilting the head-light means are provided easily operated by the driver for dimming the light 45 when approaching another car. For this purpose a circuit 46 leading from the battery 47 through the head-light 45 to the ground 48 is provided with a resistance 49 in parallel with the conductors 50—50$^a$ and a circuit breaker 51 is provided to interrupt the circuit through these conductors. The circuit breaker 51 may comprise a sleeve 51$^a$ of insulating material secured on the steering post 19 for supporting the terminals 52 and 53, a sleeve 54 of insulating material slidably mounted on the steering post and supporting a ring or sleeve 55 of conducting material, the flanged edge 56 of which normally engages both terminals 52 and 53 to electrically connect them, and a universally tiltable operating wheel 57, the hub 58 of which loosely surrounds the steering post and engages the bearing ring 59 secured to the post. For normally holding the flanged edge 56 in engagement with the terminals 52 and 53 a spring 60 may be provided bearing at one end on the flanged edge 56 and at its other end on a shoulder 61 secured to the sleeve 54. A conductor 62 connects the battery 47 with the head-light 17 and with the ground 63 and the usual variable resistance 64 may be provided for dimming both head-lights if desired, as indicated in Fig. 7.

In use when approaching another car at night the driver tilts the wheel 57 causing the hub 58 to tilt on the bearing ring 59, and push the sleeve 54 down against the pressure of the spring 60 to break the circuit between the terminals 52 and 53. This requires the current to the lamp 45 to go through the resistance 49 which dims the light sufficiently to prevent blinding the driver of the other car.

Fig. 10 shows diagrammatically another form of lighting device comprising the two head-lights 65 and 66, the head-light 65 having a dim lamp 67 and bright lamp 68, and the head-light 66 having a dim lamp 69 and a bright lamp 70. The lamps 67, 68, 69 and 70 are connected with grounds 71, 72, 73, and 74. The dim lamps 67 and 68 are connected with a battery 75 through the conductors 76 and 76$^a$ respectively and the switch 77. The bright lamp 68 is connected with the battery 75 through the conductor 78 and switch 77, and the bright lamp 70 is connected with the battery through the conductor 79, circuit breaker 51, conductor 80 and switch 77. The circuit breaker 51 may be substantially the same as the circuit breaker 51 of the form of Fig. 6 and is indicated diagrammatically. In this form of my device when another automobile is approaching the circuit breaker 51 is operated to break the circuit to the bright light 70. The light from the dim lamp 73 is not sufficiently bright to blind the driver of the other car and as the head-light 65 is permanently directed downwardly there will be no objectionable glare.

In Figs. 1 and 12 the head-light 81 of the electric railway car 82 is located adjacent the controller 83 for controlling the movement of the car and has secured thereto an operating lever 84 fulcrumed at 85 on a bearing bracket 86. Springs 87 and 88 tend to hold the head-lights 81 normally directly straight ahead. The lever 84 is located in position to be conveniently operated by the knee of the motor man who operates the controller 83. By means of the lever 84 the head-light 81 may be made to follow the curves of the track so that the latter can be illuminated.

In Figs. 13, 14, and 15, is shown a form of lighting device, which may be substituted for the head-light 18 of Fig. 1.

In this form of my invention, the casing of the lamp may be secured in fixed position on the vehicle, the reflector of the lamp being made tiltable with respect to the casing to change the direction of the light.

The lighting device itself comprises a bowl-shaped outer casing 89, which may be fixedly secured with respect to the vehicle, a tiltable parabolic reflector 90, having its focus substantially at the center of the source of light, and mounted to swing about a horizontal axis which is perpendicular to the axis of the reflector and extends through the center of the source of light, and lamp supporting and adjusting means 91 supported by the lamp casing, 89. The reflector 90 is provided with a central opening 91 at its rear, to permit the insertion and removal of the lamp 92.

The reflector 90 is pivotally supported by means of a pair of arms 93, secured to the lamp supporting means 91 in any suitable manner, to which arms 93 are pivoted at 94, a pair of arms 95, secured to a reinforcing ring 96, which is secured in the opening 91 in the reflector. The opening 91 in the reflector is made large enough to provide clearance around the lamp 92 and lamp supporting means 91 to permit tilting of the reflector.

To accomplish the tilting of the reflector a pull rod 97 may be attached to the lower edge of the reflector at 98. This pull-rod 97 may extend through openings 99 and 100 in the casing 89 and be secured to an operating mechanism such as the rock-shaft 24 and associated mechanisms in Figs. 1 and 2. The pull-rod 97 may be a flexible wire and may, if desired, operate in a flexible sheath 101, one end of which may be secured to the casing 89. For holding the reflector 90 in its normal position as shown in Fig. 13 and for returning it to this position after it has been tilted by means of the pull-rod 97, a coil-spring 102 may be provided surrounding the pull-rod 97, one end of which spring bears on the lower edge of the reflector 90 and the other end of which spring bears against the casing 89. For positioning the reflector 90 and limiting the distance to which it can be moved by means of the spring 102, a buffer 103 may be provided, secured to the casing 89 and forming a support for the upper edge of the reflector 90.

The means 91 for supporting the lamp comprise a cup-shaped sheet-metal supporting member 104, having a neck portion 105 fixedly secured in an opening in the casing 89, a receptacle 106 slidably and tiltably mounted in the cup-shaped member 104, and securing and adjusting means 107 for adjusting the receptacle 106 in the cup-shaped member 104 and for holding the receptacle in adjusted position. The receptacle 106 comprises an insulating base 108 for supporting the center and shell contacts 109 and 110 respectively, and a sheet-metal casing 111 having an annular portion 112 beaded over the flange 113 on the shell contact 110. This annular bead, 112 forms a bearing portion on which the receptacle slides and tilts within the cup-shaped member 104 when the receptacle is being adjusted.

The means 107 for adjusting the receptacle comprise a screw 114 firmly secured to the receptacle 106, a screw threaded member 115, threaded on to the screw 114, and a clamping nut 116 threaded on to the screw threaded member 115. The screw threaded member 115 has an annular flange 117 for bearing against a shoulder 118 on the cup-shaped member 104. The clamping nut 116 has an annular flange 119 for bearing on the casing 89. Tightening up the clamping nut 116 draws the flange 117 against the shoulder 118. The screw 114 is secured to the receptacle 106 by means of a frusto-conical flange 120 on the casing 111 which engages the head 121 of the screw 114 to hold it firmly against the insulating base 108. To prevent the receptacle 106 from being rotated within the cup-shaped member 104, the cup-shaped member is cut away on its lower side at 122 to form a slot through which a portion of the base 108 extends and in which this extended portion of the base slides when the receptacle is shifted axially.

To shift the receptacle 106 axially in the cup-shaped member 104, the nut 116 is loosened and the threaded member 115 is rotated in one direction or the other, to change its position relative to the screw 114. The nut 116 is then tightened up again to draw the flange snugly against the shoulder 118. This will result in an axial shifting of the receptacle 106 in the cup-shaped member 104. To tilt the receptacle 106 about the bead 112 as a fulcrum the nut 116 is loosened and the screw threaded member 115 is moved up or down or sidewise in the desired direction to tilt the receptacle 106 about the bead 112 as a fulcrum.

By means of this axial and tilting adjustment of the receptacle 106, the center of the source of light may be brought to the desired position with respect to the reflector 90. This desired position for the center of the course of light, may be at the focal point of the parabolic reflector. Since the reflector 90 itself is pivoted to swing about the axis which extends through its focal point, the center of the source of light will remain at the focal point of the reflector no matter to what position the reflector may be tilted.

Having thus described my invention what I claim as new and desire to secure by Letters Patent is:—

1. A lighting device comprising a bowl-shaped casing, a bowl-shaped reflector mounted in said casing, said bowl-shaped reflector member having an axial opening therein, said casing being provided with means in alinement with said opening for supporting a lamp in said reflector and being provided with means for tiltably supporting said reflector in said casing, and means operable from the outside of said casing for adjusting the lamp to properly position it in said reflector.

2. A lighting device comprising a bowl-shaped casing, the bowl-shaped reflector mounted in said casing, said reflector having an axial opening therein, said casing being provided with means in alinement with said axial opening for supporting a lamp in said reflector, and a pair of arms extending from said supporting means along opposite sides of said reflector on which arms said reflector is tiltably mounted.

In witness whereof I have hereunto subscribed my name.

REUBEN B. BENJAMIN.